United States Patent [19]

Cullison

[11] Patent Number: 4,570,350

[45] Date of Patent: Feb. 18, 1986

[54] APPARATUS AND METHOD FOR FORMING WALL BASE COVED TRIM STRIP MATERIAL

[76] Inventor: Jesse L. Cullison, 7801 Washington Park Dr., Dayton, Ohio 45459

[21] Appl. No.: 665,007

[22] Filed: Oct. 26, 1984

[51] Int. Cl.[4] .......... G01B 3/00

[52] U.S. Cl. .......... 33/562; 30/289; 83/56

[58] Field of Search .......... 33/174 G, 197, DIG. 20; 30/289, 293

[56] References Cited

U.S. PATENT DOCUMENTS

| | | | |
|---|---|---|---|
| 2,873,534 | 2/1959 | Puruiance | 33/174 G |
| 3,217,393 | 11/1965 | Johnson | 33/174 G |
| 3,222,792 | 12/1965 | Eshom | 33/174 G |
| 4,143,463 | 3/1979 | Trankle | 30/289 |
| 4,330,939 | 5/1982 | Robinson | 30/289 |
| 4,505,039 | 3/1985 | Donovan | 33/174 G |

OTHER PUBLICATIONS

Catalog 116 Beno J. Gundlach Co., Post Office Box 544, Belleville, Illinois 62222, p. 11.

*Primary Examiner*—Willis Little

*Attorney, Agent, or Firm*—Jacox & Meckstroth

[57] ABSTRACT

A tool or apparatus for retaining a strip of coved wall trim material during formation of an end surface on the strip so that the end surface is complementary to the end surface of another strip for providing a joint in an inside corner or at an outside corner of a room.

The tool or apparatus comprises a pair of clamp members, in which each clamp member is provided with a cutting blade guide surface. The clamp members have portions for retaining the main part of the strip and portions for retaining the coved part of the strip, as a cutting member is moved along the cutting blade guide surfaces and properly form an end surface on the strip.

15 Claims, 16 Drawing Figures

FIG-5
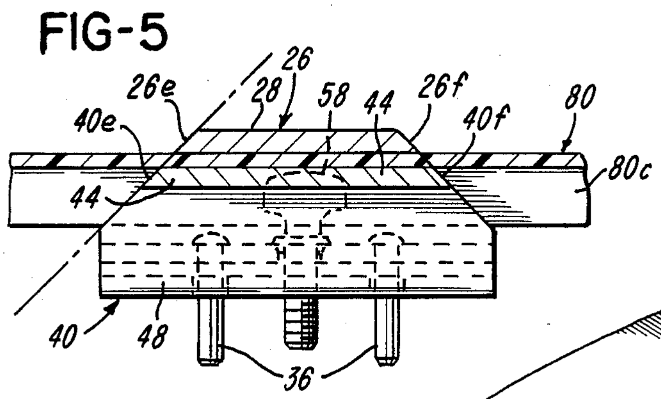
FIG-6
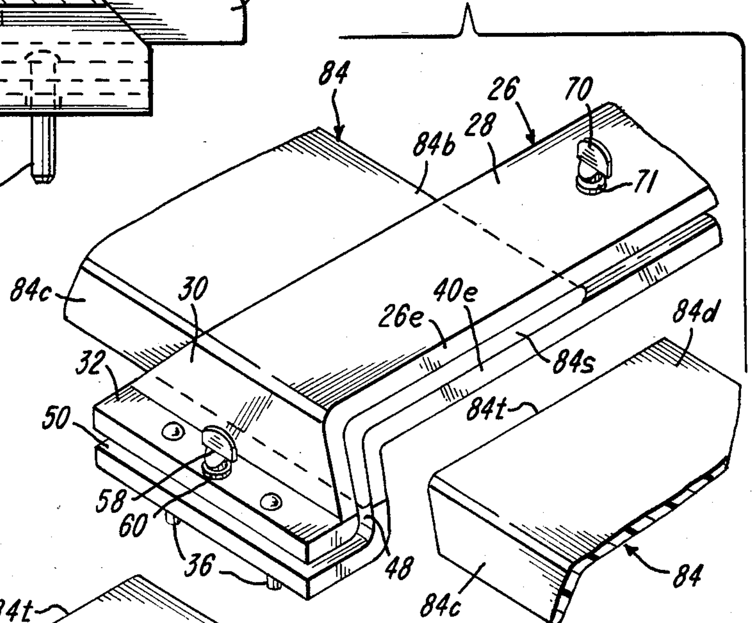
FIG-7
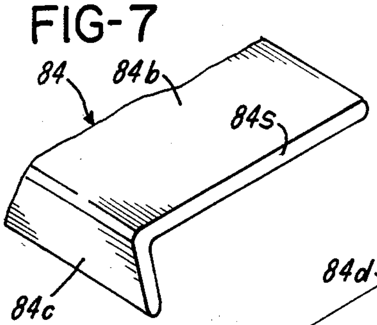
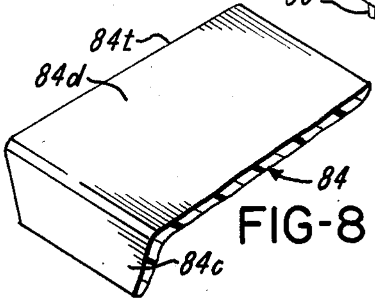
FIG-8
FIG-9
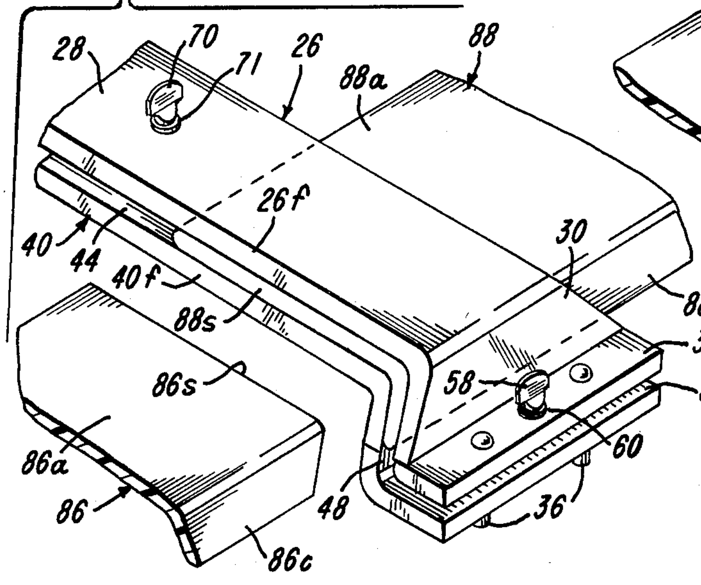
FIG-10
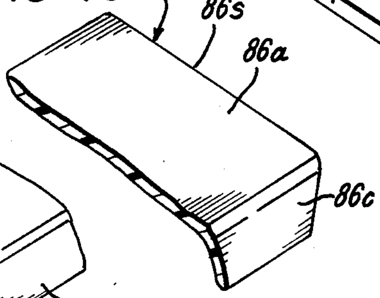
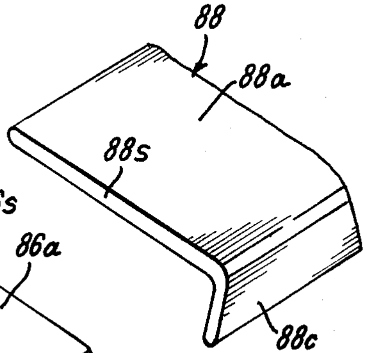
FIG-11

FIG-12
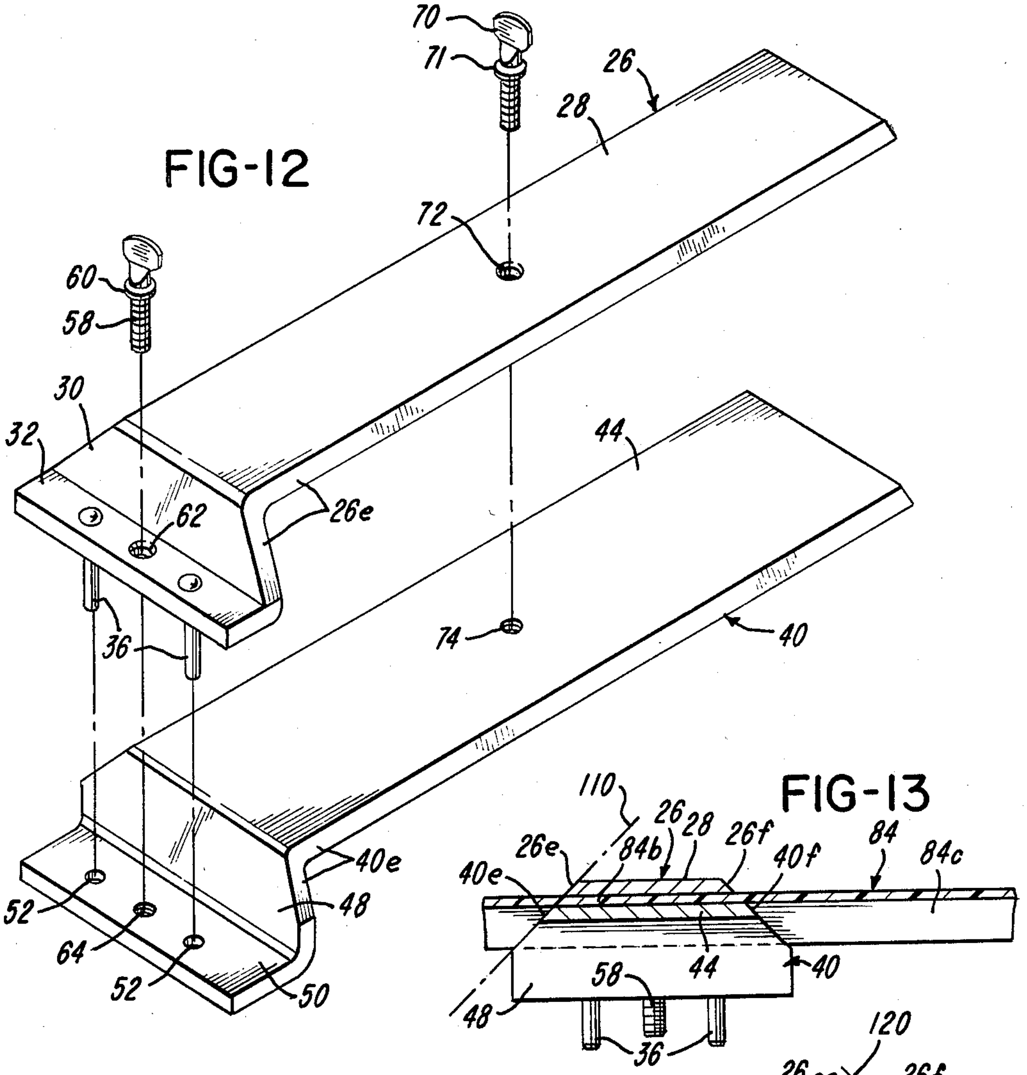
FIG-13
FIG-14
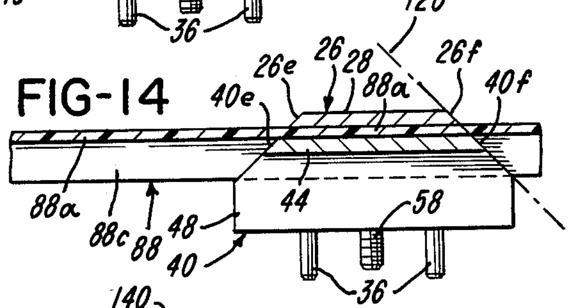
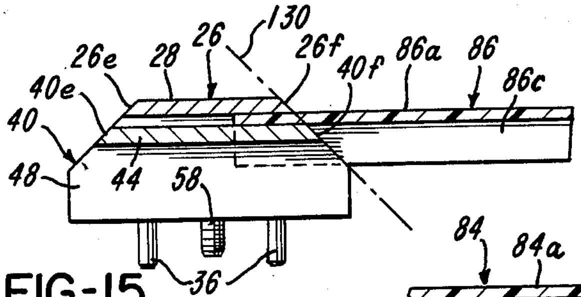
FIG-15
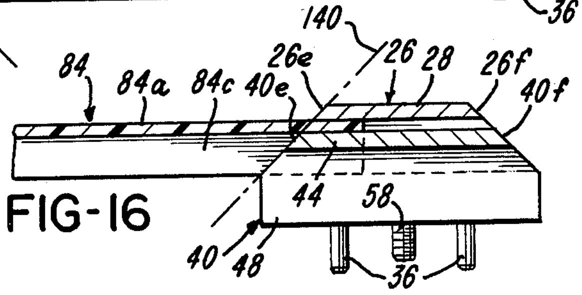
FIG-16

APPARATUS AND METHOD FOR FORMING WALL BASE COVED TRIM STRIP MATERIAL

BACKGROUND OF THE INVENTION

One type of wall trim material comprises a strip of material which is adapted to be applied to the lower edge or base of a wall surface. The main portion of the strip of material is substantially flat. However, the lower edge of the strip of material is coved and extends outwardly from the main portion of the strip.

A wall in a room usually has inside corners and outside corners. Two strips of trim material terminate and meet at each corner. The ends of these two strips must be formed so that the ends of the two strips form a neat joint at each corner. Due to the fact that the lower edge of the strip is coved, it has been difficult to form the ends of the two strips of coved material in a manner in which the ends join smoothly and neatly at a corner.

An object of this invention is to provide a tool which is employed to form strips of coved base trim material so that the ends thereof meet and cooperate properly with the ends of complementary strips to form neat joints in inside corners and at outside corners of a wall.

It is another object of this invention to provide such a tool which can be used without difficulty.

It is another object of this invention to provide such a tool which is readily portable.

It is another object of this invention to provide such a tool which can be constructed at relatively low costs and which is durable and long lived.

Other objects and advantages of this invention reside in the construction of parts, the combination thereof, and the method of use, as will become more apparent from the following description.

Summary of the Invention

This invention comprises an apparatus or tool which includes an upper clamp member and a lower clamp member for retaining a strip of trim material and for forming an end of the strip. The strip of trim material has a main portion and a coved portion. The upper and lower clamp members are complementary. The clamp members are adapted to retain a strip of coved trim material during the formation of an end of the strip. Each of the clamp members has an inclined edge surface adapted to receive a cutting instrument as the cutting instrument is moved along the edge surfaces and severs a part of the strip which extends from the clamp members. Each of the clamp members has a generally flat main surface portion and a generally flat offset surface portion. The main surface portions and the offset surface portions of the clamp members are positioned in facing relationship for retaining a strip of coved trim material therebetween. The main portion of the strip is positioned between the main surface portions of the clamp members, and the coved portion of the strip is positioned between the offset portions of the clamp members. Means are provided to retain the upper clamp member in position above the lower clamp member, while permitting the upper clamp member to move upwardly and downwardly with respect to the lower clamp member. Means are also provided to secure the upper clamp member with respect to the lower clamp member.

BRIEF DESCRIPTION OF THE VIEWS OF THE DRAWINGS

FIG. 5 is a section view taken substantially on line 5—5 of FIG. 4 and illustrating the forming of a strip of coved base trim material by use of the tool of this invention.

FIG. 6 is a fragmentary perspective exploded view similar to FIG. 4 and illustrating a trim strip which has an end which has been formed by means of the tool of this invention.

FIG. 7 is a fragmentary perspective view, drawn on substantially the same scale as FIG. 6, showing another strip of coved base trim material which has an end which has been formed by the tool of this invention.

FIG. 8 is a fragmentary perspective view showing another strip of coved base trim material which has an end which has been formed by the tool of this invention.

FIG. 9 is a fragmentary perspective exploded view, similar to FIG. 4, but drawn on an angle with respect to FIG. 4. This figure also illustrates a strip of trim material, an end of which has been formed by the tool of this invention.

FIG. 10 is a fragmentary perspective view showing a strip of trim material having an end which has been formed by the use of the tool of this invention, the end being complementary to the end of the portion of the strip shown in FIG. 8.

FIG. 11 is a fragmentary perspective view showing a strip of trim material having an end which has been formed by the use of the tool of this invention and in which the end is complementary to the end of the strip shown in FIG. 7.

FIG. 12 is an exploded type of view of a tool of this invention.

FIG. 13 is a sectional view similar to FIG. 5, but drawn on a smaller scale than FIG. 5, and illustrating the forming of a strip of coved base trim material to provide an end surface which is complementary to the end surface of another strip to form a joint at an outside corner of a wall.

FIG. 14 is a sectional view similar to FIG. 13 and drawn on substantially the same scale as FIG. 13, illustrating the forming of a strip of trim material to provide an end surface which is complementary to the end surface of the strip formed as shown in FIG. 13 for creating a joint at an outside corner of a wall.

FIG. 15 is a sectional view similar to FIGS. 13 and 14, illustrating the forming of a strip of coved base trim material to provide an end surface for positioning at an inside corner of a wall.

FIG. 16 is a section view similar to FIGS. 13, 14, and 15 illustrating the cutting of a strip of coved base trim material to provide an end surface which is complementary to the end surface of the strip formed as shown in FIG. 15 to create a joint in an inside corner of a wall.

DESCRIPTION OF THE PREFERRED EMBODIMENT

Figure 1:
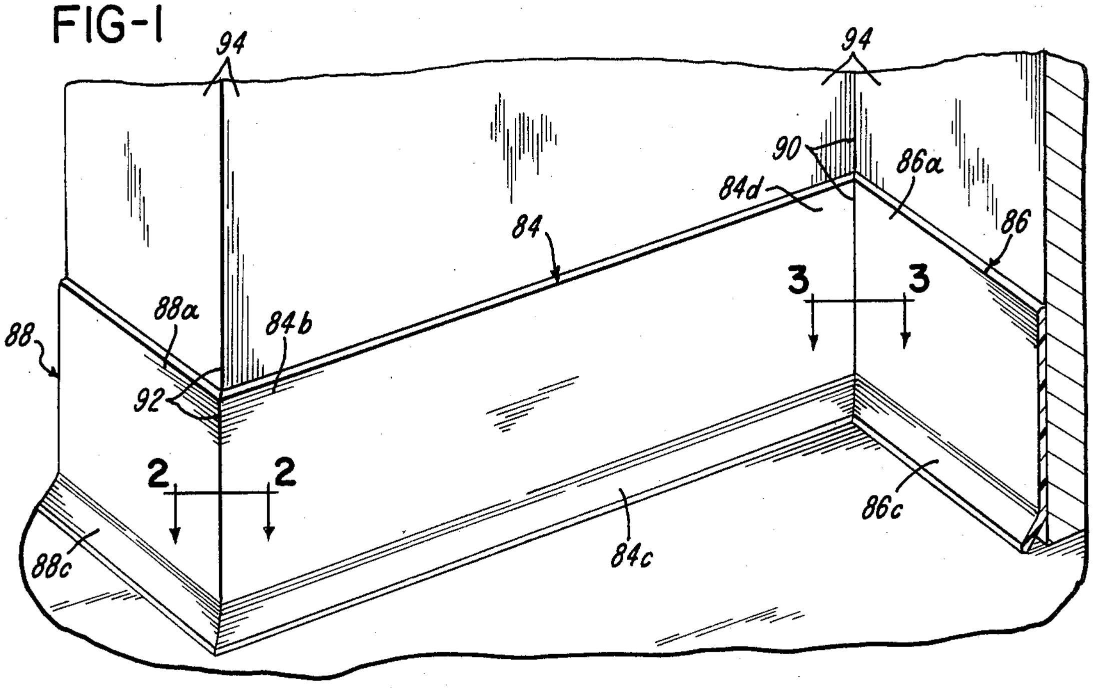
FIG. 1 is a perspective view of the lower portion of a wall and showing an inside corner and an outside corner of the wall and showing coved base trim material attached to the wall, as the ends of strips of the trim material form a joint at each of the corners.

A tool or apparatus of this invention comprises an upper clamp member 26, provided with a substantially flat body portion 28. An offset portion 30 extends downwardly from the body portion 28. A foot portion 32 extends from the offset portion 30, substantially parallel to the body portion 28. Attached to the foot portion 32 and extending downwardly therefrom are a plurality of support stems 36.

Positioned below the upper clamp member 26 is a lower clamp member 40 which has a substantially flat body portion 44. An offset portion 48 extends downwardly from the body portion 44. A foot portion 50 extends from the offset portion 48 and is substantially parallel to the body portion 44. The foot portion 50 has apertures 52 therethrough which slidably receive the stems 36 which are attached to the portion 32 of the upper clamp member 26. A threaded bolt 58, provided with a collar 60, extends freely through an aperture 62 in the foot portion 32 of the upper clamp member 26 and is threaded into an aperture 64 in the foot portion 50 of the lower clamp member 40. A threaded bolt 70 having a collar 71 extends freely through an aperture 72 in the body portion 28 of the upper clamp member 26 and is threaded into an aperture 74 in the body portion 44 of the lower clamp member 40.

As shown, the upper clamp member 26 has a narrower width than the lower clamp member 40.

The body portion 28 and the offset portion 30 of the upper clamp member 26 have side edge surfaces 26*e* at one side thereof and side edge surfaces 26*f* at the other side thereof. The side edge surfaces 26*e* and 26*f* are substantially forty-five degrees with respect to the portions 28 and 30. The portions 44 and 48 of the lower clamp member 40 have opposed side edge surfaces 40*e* and side edge surfaces 40*f* which are substantially forty-five degrees with respect to the portions 44 and 48. Each of the side edge surfaces 26*e*, 26*f*, 40*e*, and 40*f* serve as a cutting blade guide edge surface.

OPERATION

As stated above, the tool of this invention is used for forming an end surface on a strip of coved trim material so that the end surface is complementary to the end surface of an adjacent strip of coved trim material so that the ends of the two adjacent strips form a neat joint within an inside corner of a wall or at an outside corner of a wall.

Figure 4:
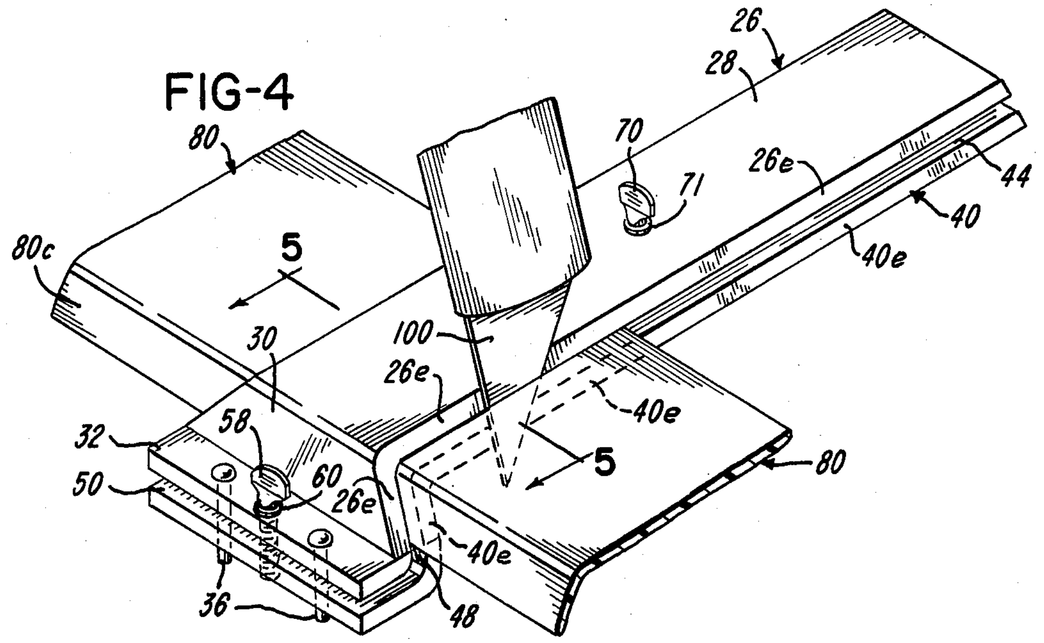
FIG. 4 is a perspective view drawn on a slightly smaller scale than FIGS. 2 and 3 and illustrating the use of a tool of this invention in forming a strip of coved base trim material to provide the strip of trim material with an end surface which is complementary to the end surface of another coved strip of trim material so that the two end surfaces form a neat joint at a corner of a wall.

FIG. 4 shows the forming of an end surface of a strip 80 of coved trim material. The strip 80 has a coved part 80*c* extending along the length thereof. The strip 80 is positioned between the upper clamp member 26 and the lower clamp member 40, as shown in FIG. 4. The strip 80 is positioned so that the coved part 80*c* thereof is between the offset portion 30 of the upper clamp member 26 and the offset portion 48 of the lower clamp member 40. Then the bolts 58 and 70 are tightened within the respective apertures 64 and 74. Thus, the strip 80 is clamped between the upper clamp member 26 and the lower clamp member 40. When the strip 80 is so clamped between the upper clamp member 26 and the lower clamp member 40, the side edge surfaces 26*e* of the upper clamp member 26 are in substantially the same plane as the side edge surfaces 40*e* of the lower clamp member 40, as illustrated in FIGS. 5, 13–16. Then, as illustrated, in FIGS. 4 and 5, a cutting blade 100 is moved along the side edge surfaces 26e of the portions 28 and 30 of the upper clamp member 26 and along the side edge surfaces 40*e* of the portions 48 and 44 of the lower clamp member 40. The strip 80 of coved base trim material is thus formed so that the strip 80 has an end surface which is complementary to the end surface of an adjacent strip within an inside corner of a wall, to form a neat joint in the inside corner of the wall.

FIG. 1 illustrates an inside corner 90 and an outside corner 92 of a wall 94. The wall 94 extends upwardly from a floor 96. As shown in FIG. 1, a strip 84 of coved base trim material has an end portion 84*d* in the inside corner 90 and an end portion 84*b* at the outside corner 92. The strip 84 has a coved portion 84*c*. As also shown in FIG. 1, a strip 86 has an end portion 86*a* in the inside corner 90. The strip 86 has a coved portion 86*c*. Also a strip 88 has an end portion 88*a* at the outside corner 92. The strip 88 has a coved portion 88*c*.

Figure 2:
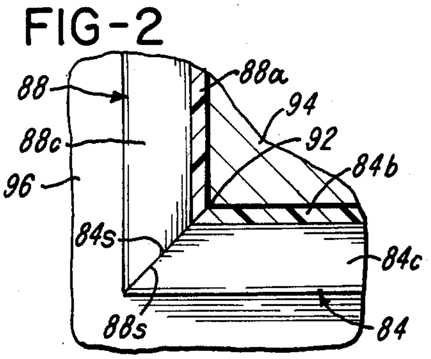
FIG. 2 is an enlarged section view taken substantially on line 2—2 of FIG. 1.

As illustrated in FIG. 13, in order to form a proper end surface on the end portion 84*b* of the strip 84 for the outside corner 92, the strip 84 is positioned and clamped between the upper clamp member 26 and the lower clamp member 40. Only a short part of the strip 84 extends from the side edges 26*e* and 40*e*. The main portion of the strip 84 extends from the side edge surfaces 26*f* and 40*f*. The coved portion 84*c* of the strip 84 is clamped between the offset portion 30 of the upper clamp member 26 and the offset portion 48 of the lower clamp member 40. Then, as illustrated by a broken line 110 in FIG. 13, the strip 84 is cut along the side edge surfaces 26*e* and 40*e* of the clamp members 26 and 40, respectively. Thus, only a small portion of the strip 84 is severed from the main body of the strip 84, as shown in FIG. 13. The end portion 84*b* of the strip 84 has an end surface 84*s* formed thereon as shown in FIG. 7, for positioning at the outside corner 92 in the manner illustrated in FIGS. 1 and 2.

As illustrated in FIG. 14, in order to form an end surface of the end portion 88*a* of the strip 88, the strip 88 is clamped between the upper clamp member 26 and the lower clamp member 40. The coved portion 88*c* of the strip 88 is clamped between the offset portions 30 and 48 of the clamp members 26 and 40, respectively. Only a small part of the strip 88 extends from the side edge surfaces 26*f* and 40*f* of the clamp members 26 and 40, as shown in FIG. 14. Then the strip 88 is cut as illustrated by a broken line 120 along the side edge surfaces 26*f* and 40*f*, as the main portion of the strip 88 extends to the left of the clamping members 26 and 40, as shown in FIG. 14. An end surface 88*s* of the end portion 88*a* is thus formed by the cutting action illustrated in FIG. 14, and appears as shown in FIG. 11 to be complementary with the end surface 84*s* of the end portion 84*b* of the strip 84. This condition is illustrated in detail in FIG. 2.

As illustrated in FIG. 15, in order to properly form the end surface of the end portion 86*a* of the strip 86, a small end part of the strip 86 is clamped between the upper clamp member 26 and the lower clamp member 44. The coved portion 86*c* of the strip 86 is clamped between the offset portions 30 and 48 of the clamp members 26 and 40 respectively. Then the strip 86 is cut along the side edge surfaces 26*f* and 40*f*, as illustrated by a broken line 130 in FIG. 15. Only a small end part of the strip 86 is removed by the cutting action, and the end portion 86*a* has an end surface 86*s*, shown in FIG. 10, properly formed by the cutting action. The end surface 86*s* of the end portion 86*a* is thus formed to be positioned in the inside corner 90 of the wall 94.

Figure 3:
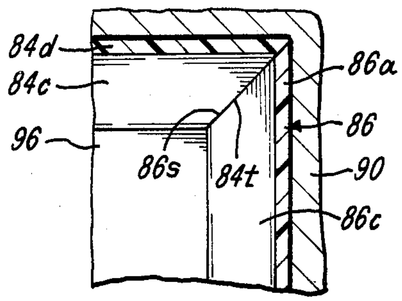
FIG. 3 is an enlarged section view taken substantially on line 3—3 of FIG. 1.

As illustrated in FIG. 16, in order to properly form the end portion 84*d* of the strip 84, the strip 84 is clamped between the upper clamp member 26 and the lower clamp member 40, as illustrated in FIG. 16. The coved portion 84*c* of the strip 84 is clamped between the offset portions 30 and 48 of the clamp members 26 and 40, respectively. Only a small part of the strip 84 is positioned between the clamp members 26 and 40. The main part of the strip 84 extends to the left of the clamp members 26 and 40, as shown in FIG. 16. Then the end portion 84*d* of the strip 84 is cut along the side edge surfaces 26*e* and 40*e* of the clamp members 26 and 40, respectively, as illustrated by a broken line 140 in FIG. 16. Thus, an end surface 84*t* of the end portion 84*d* of the strip 84 is formed, as illustrated in FIG. 8, to be complementary with the end surface 86*s* of the end portion 86*a* of the strip 86 for positioning in the inside corner 90. FIG. 3 shows this condition in detail.

Therefore, it is understood that the tool of this invention is used in forming end portions of coved base trim strips for either inside corners or outside corners. A trim strip in which the end surface is to be formed is positioned between the clamp members 26 and 40. The coved portion of the strip is positioned between the offset portions 30 and 48 of the clamp members 26 and 40, respectively. The main portion of the strip extends in a proper direction from the clamp members 26 and 40. Then the strip is cut along the proper side edge surfaces of the clamp members 26 and 40.

Although the preferred embodiment of the apparatus and method of this invention for forming the end surfaces of wall trim coved base strip material has been described, it will be understood that within the purview of this invention various changes may be made in the form, details, proportion and arrangement of parts, the combination thereof, and the mode of use, which generally stated consist in a structure or method within the scope of the appended claims.

The invention having thus been described, the following is claimed.

1. Apparatus for use in forming the end of a strip of wall base trim material for positioning within an inside corner or at an outside corner of a wall, the strip of wall base trim material having a coved portion along the length thereof, comprising:

- a first clamp member, the first clamp member being provided with a substantially flat body portion and an offset portion which extends angularly from the body portion and a foot portion which extends angularly from the offset portion, the body portion and the offset portion of the first clamp member having opposed side edge surfaces which are angular with respect to said portions, the body portion of the first clamp member having a given width dimension, the foot portion of the first clamp member having a width dimension greater than said given width dimension of the body portion, the offset portion having a gradually increasing width dimension extending between the body portion and the foot portion,
- a second clamp member, the second clamp member being provided with a substantially flat body portion and an offset portion which extends angularly from the body portion and a foot portion which extends angularly from the offset portion, the body portion and the offset portion of the second clamp member having opposed side edge surfaces which are angular with respect to said portions, said portions of the second clamp member being positioned above the corresponding portions of the first clamp member, said portions of the second clamp member being narrower in width than the corresponding portions of the first clamp member, the clamp members being adapted to receive a part of a strip of base wall trim material therebetween, with the coved portion of the strip material between the offset portions of the clamp members, the side edge portions of the first and second clamp members being substantially in the same plane when a part of a strip of base trim material is positioned between the first clamp member and the second clamp member, for receipt of a cutting member which is moved along the side edge surfaces at one side of the first clamp member and the second clamp member.

2. The apparatus of claim 1 in which the opposed side edge surfaces of the first clamp member and the second clamp member are at substantially forty-five degrees with respect to said body portions of the clamp members.

3. Apparatus for use in forming the end surface of a strip of base wall trim material in which the strip of base trim material has a coved portion along the length thereof comprising: first and second clamp members arranged in superposed relationship, there being a lower clamp member and an upper clamp member, each of the clamp members having a main portion and an offset portion, the main portions of the clamp members being in facing relationship, the offset portions of the clamp members being in facing relationship, each of the clamp members having a side edge surface along the main portion thereof and a side edge surface along the offset portion thereof, the clamp members being relatively movable to position the side edge surfaces of the clamp members in substantially the same given plane, the clamp members being adapted to retain a part of a strip of base wall trim material therebetween, with the coved portion of the strip between the offset portion of the clamp members, the side edge surfaces of the clamp members being adapted to guide a cutting member which moves therealong in cutting the strip to form an end of the strip for positioning adjacent a corner of a wall.

4. The apparatus of claim 3 in which the main portion of each clamp member has a given width dimension and in which the offset portion of each clamp member extends from the main portion thereof and gradually increases in width as the offset portion extends from the main portion.

5. A device for use in forming the end of a strip of wall trim material in which the strip of trim material has a coved portion along the length thereof, comprising: a first clamp member and a second clamp member, the clamp members being in superposed relationship, each of the clamp members having a main portion and an offset portion, each of the clamp members having an inclined side edge surface along the main portion and an inclined side edge surface along the offset portion, the clamp members being relatively movable to position the side edge surface of the first clamp member in substantially the same plane as the side edge surface of the second clamp member along the main portion and along the offset portion thereof, the clamp members being adapted to receive and to retain a part of a strip of wall trim material therebetween, with the coved portion of the strip of wall trim material between the offset portions of the clamp members, an end surface of the strip of wall trim material being formed by cutting the strip along the side edge surfaces of the main portions and along the side edge surfaces of offset portions of the clamp members as the strip is retained between the clamp members.

6. The device of claim 5 in which the inclined side edge surface of each of said portions is at substantially forty-five degrees with respect to that portion.

7. The device of claim 5 in which the main portion of the first clamp member has a smaller dimension than the main portion of the second clamp member.

8. The device of claim 5 in which the main portion of the first clamp member has a smaller dimension than the main portion of the second clamp member and the offset portion of the first clamp member has a smaller dimension than the offset portion of the second clamp member.

9. The method of forming an end surface of a strip of wall base trim material which is provided with a main part and a coved part along the length thereof, so that the end surface of the strip is complementary to the end surface of another strip of wall base trim material to form a neat joint at a corner of a wall comprising: retaining the strip of coved base wall material between a pair of clamp members in which each clamp member has an offset portion and a main portion, with the coved part of the strip between the offset portions of the clamp members and with the main part of the strip between the main portions of the clamp members, each of the clamp members having a cutting blade guide edge surface along the main portion thereof and along the offset portion thereof, the cutting blade edge surface of the clamp members being angular with respect to said portions of the clamp members, the clamp members being relatively positioned so that the cutting blade guide edge surface of one clamp member is in substantially the same plane as the cutting blade guide edge surface of the other clamp member, followed by cutting the strip of material along the cutting blade guide edge surface of the clamp members.

10. A device for use in forming an end surface on a strip of wall base trim material having a coved portion, comprising:

a pair of clamp members, there being a first clamp member and a second clamp member, each of the clamp members having a main surface, the clamp members being superposed with the main surface of one clamp member facing the main surface of the other clamp member, each of the clamp members having a secondary surface which is angular with respect to the flat main surface thereof, the secondary surfaces of the clamp members being in facing relationship, each of the clamp members having a cutting blade guide surface which is angular with respect to the main surface and the secondary surface thereof, the surfaces of the clamp members being adapted to retain a strip of wall base trim material therebetween, with the coved portion of the wall base trim material being between the secondary surfaces of the clamp members and with an extending part of the strip extending from the cutting blade guide surfaces of the clamp members, the cutting blade guide surfaces being adapted to receive a cutting blade which moves along the cutting blade guide surfaces and severs the extending part of the strip and forms an end surface on the strip.

11. The device of claim 10 in which the main surface and the secondary surface of each of the clamp members is substantially flat.

12. The device of claim 10 in which the cutting blade guide surface of each of the clamp members is substantially forty-five degrees with respect to the main surface and with respect to the secondary surface.

13. The device of claim 10 which includes means for securing the position of the first clamp member with respect to the position of the second clamp member.

14. The device of claim 10 in which each of the clamp members has a width dimension and in which the width dimension of the first clamp member is less than the width dimension of the second clamp member.

15. The device of claim 10 in which each of the clamp members has a width dimension and in which the width dimension of the first clamp member is less than the width dimension of the second clamp member, and in which the clamp members are relatively movable to position the cutting blade guide surfaces of both clamp members in the same general plane.

* * * * *